(12) United States Patent  
Chen

(10) Patent No.: US 7,207,927 B2  
(45) Date of Patent: Apr. 24, 2007

(54) TREADMILL ROLLER DEVICE HAVING BEARING

(76) Inventor: Chung An Chen, No. 36-2, Lane 170, Sec. 1, Shenlin Road, Daya Hsiang, Taichung Hsien 42865 (TW)

( * ) Notice: Subject to any disclaimer, the term of this patent is extended or adjusted under 35 U.S.C. 154(b) by 0 days.

(21) Appl. No.: 11/158,709

(22) Filed: Jun. 21, 2005

(65) Prior Publication Data

US 2006/0287164 A1 Dec. 21, 2006

(51) Int. Cl.
*A63B 22/02* (2006.01)

(52) U.S. Cl. .......................................... 482/54; 384/215

(58) Field of Classification Search .................. 482/54, 482/51; 193/35 R, 37; 492/47; 384/215, 384/537, 546
See application file for complete search history.

(56) References Cited

U.S. PATENT DOCUMENTS 3,332,683 A   7/1967   Rand
3,793,689 A * 2/1974   Specth ........................ 193/37
3,957,147 A * 5/1976   Specht ........................ 193/37
4,373,759 A * 2/1983   Greener et al. ............. 384/480
4,659,074 A   4/1987   Taitel et al. ................... 272/69
5,046,869 A * 9/1991   Roberts et al. ............. 384/537

* cited by examiner

*Primary Examiner*—(Jackie) Tan-Uyen Ho  
*Assistant Examiner*—Tam Nguyen  
(74) *Attorney, Agent, or Firm*—Charles E. Baxley

(57) ABSTRACT

A roller device for attaching to a shaft of a treadmill, includes a tubular housing having two carriers engaged in the end portions, and the carriers each includes a casing directly folded from the end portion of the housing, and two bearing members are engaged in the casings of the carriers, for engaging with the shaft, and for smoothly and rotatably attaching the housing to the shaft, and for allowing the roller device to be easily and readily attached to treadmills. The casing includes an outer peripheral flap formed integral with the housing, and includes an outer diameter smaller than an inner diameter of the housing, for resiliently supporting the casing within the housing.

1 Claim, 6 Drawing Sheets

TREADMILL ROLLER DEVICE HAVING BEARING

BACKGROUND OF THE INVENTION

1. Field of the Invention

The present invention relates to a roller device for treadmills, and more particularly to a treadmill roller device having a structure for receiving and retaining one or more bearings therein, and for allowing the roller device to be easily and readily attached to treadmills.

2. Description of the Prior Art

Typical treadmills comprise two or more roller devices rotatably attached to a tread base or a base frame, and an endless belt engaged around the roller devices, for allowing the endless belt to be smoothly moved or rotated around the roller devices. However, the typical roller devices have no bearings provided or engaged therein, such that the tread base or the base frame have to be provided and engaged a number of bearings therein, to smoothly attach and support the roller devices on the tread base or the base frame.

For example, U.S. Pat. No. 3,332,683 to Rand discloses one of the typical treadmills also comprising a tread base or a base frame including a number of bearings provided and engaged therein, to rotatably attach and support two or more roller devices thereto, and an endless belt engaged around the roller devices, for allowing the endless belt to be smoothly moved or rotated around the roller devices. However, similarly, the typical roller devices have no bearings provided or engaged therein, such that the tread base or the base frame also have to be provided and engaged a number of bearings therein, to smoothly attach and support the roller devices on the tread base or the base frame.

U.S. Pat. No. 4,659,074 to Taitel et al. discloses another typical treadmill also comprising a tread base or a base frame including a number of bearings provided and engaged therein, to rotatably attach and support two or more roller devices thereto, and a number of inserts or support members are required to be engaged into the ends of the roller devices, before the roller devices may be rotatably attached to the tread base or the base frame. In addition, similarly, the typical roller devices also have no bearings provided or engaged therein, such that the tread base or the base frame also have to be provided and engaged the bearings therein, to smoothly attach and support the roller devices on the tread base or the base frame.

The present invention has arisen to mitigate and/or obviate the afore-described disadvantages of the conventional roller devices.

SUMMARY OF THE INVENTION

The primary objective of the present invention is to provide a roller device including a structure for receiving and retaining one or more bearings therein, and for allowing the roller device to be easily and readily attached to treadmills.

In accordance with one aspect of the invention, there is provided a roller device for attaching to a shaft of a treadmill, the roller device comprising a tubular housing including two end portions each having a carrier provided therein, and each of the carriers including a casing folded from the end portion of the housing, and two bearing members engaged in the casings of the carriers respectively, for engaging with the shaft, and for rotatably attaching the housing to the shaft, and for allowing the roller device to be easily and readily attached to treadmills.

The casing includes an outer peripheral flap extended radially and outward therefrom and formed integral with the housing. The casing includes an outer diameter smaller than an inner diameter of the housing, for forming an annular channel between the casing of the carrier and the housing, and for resiliently supporting the casing within the housing.

The casing includes an inner peripheral flange extended radially and inwardly therefrom, to form an orifice therein for rotatably receiving the shaft in the orifice thereof, and to form a partially opened chamber therein for receiving and anchoring the bearing therein.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
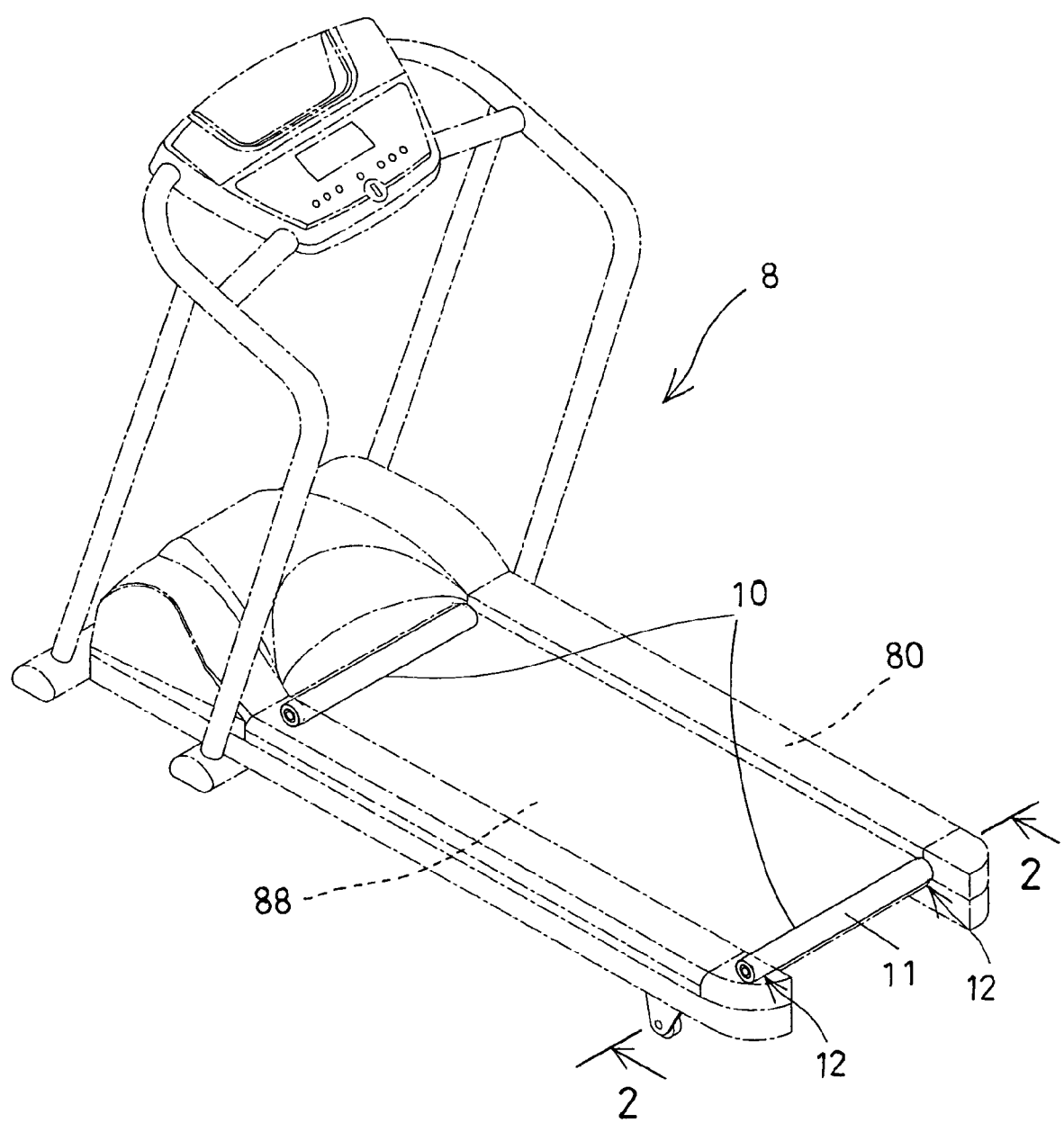
FIG. 1 is a partial perspective view of a treadmill having a roller device in accordance with the present invention.

Referring to the drawings, and initially to FIG. 1, one or more roller devices 10 in accordance with the present invention are provided for rotatably attaching to a tread base or a base frame 80 of a treadmill 8, and an endless belt 88 engaged around the roller devices 10, for allowing the endless belt 88 to be smoothly moved or rotated around the roller devices 10.

Figure 2:
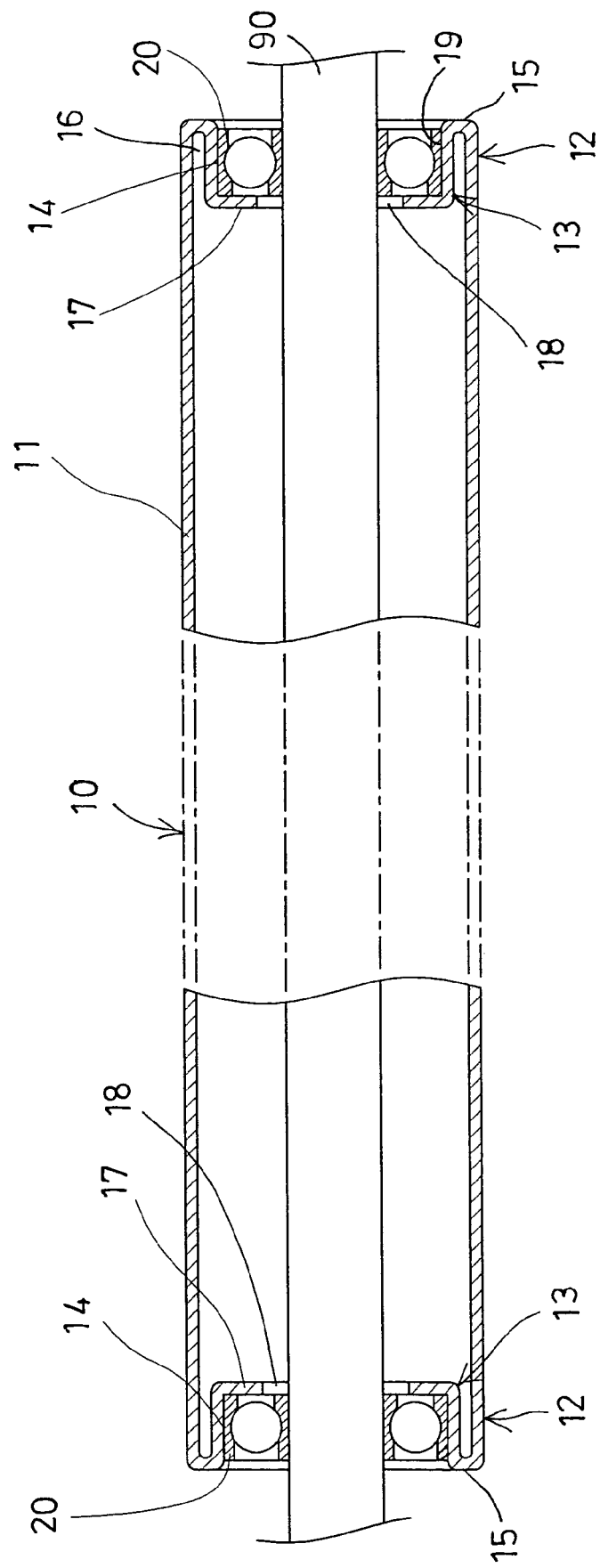
FIG. 2 is a partial cross sectional view of the roller device, taken along lines 2—2 of FIG. 1.

Referring next to FIG. 2, illustrated is one example of the roller devices 10 in accordance with the present invention and comprises an elongated outer cylindrical or tubular housing 11 including two end portions 12 each having a compartment or a holder or a carrier 13 formed and provided therein, for receiving and supporting a bearing member 20 therein.

It is preferable that the carriers 13 are directly bent or folded inwardly from, and formed integral with the two end portions 12 of the elongated outer cylindrical or tubular housing 11, and each includes a cylindrical or peripheral casing 14 having an outer peripheral flap 15 extended radially and outward from the outer portion thereof, and solidly secured to or formed integral with the housing 11.

The casings 14 of the carriers 13 include an outer diameter smaller than an inner diameter of the housing 11, for forming or defining an annular or peripheral channel 16 between the casings 14 of the carriers 13 and the housing 11, and thus for allowing the casings 14 of the carriers 13 to be resiliently supported within the housing 11.

The casings 14 of the carriers 13 each includes a peripheral flange 17 extended radially and inward from the inner portion thereof, to form an orifice 18 therein for rotatably receiving a shaft 90 therein, and to form a partially opened chamber 19 therein for receiving and anchoring the bearing 20 therein, and for allowing the bearings 20 to be solidly or stably anchored and retained within the casings 14 of the carriers 13 respectively.

Figure 3:
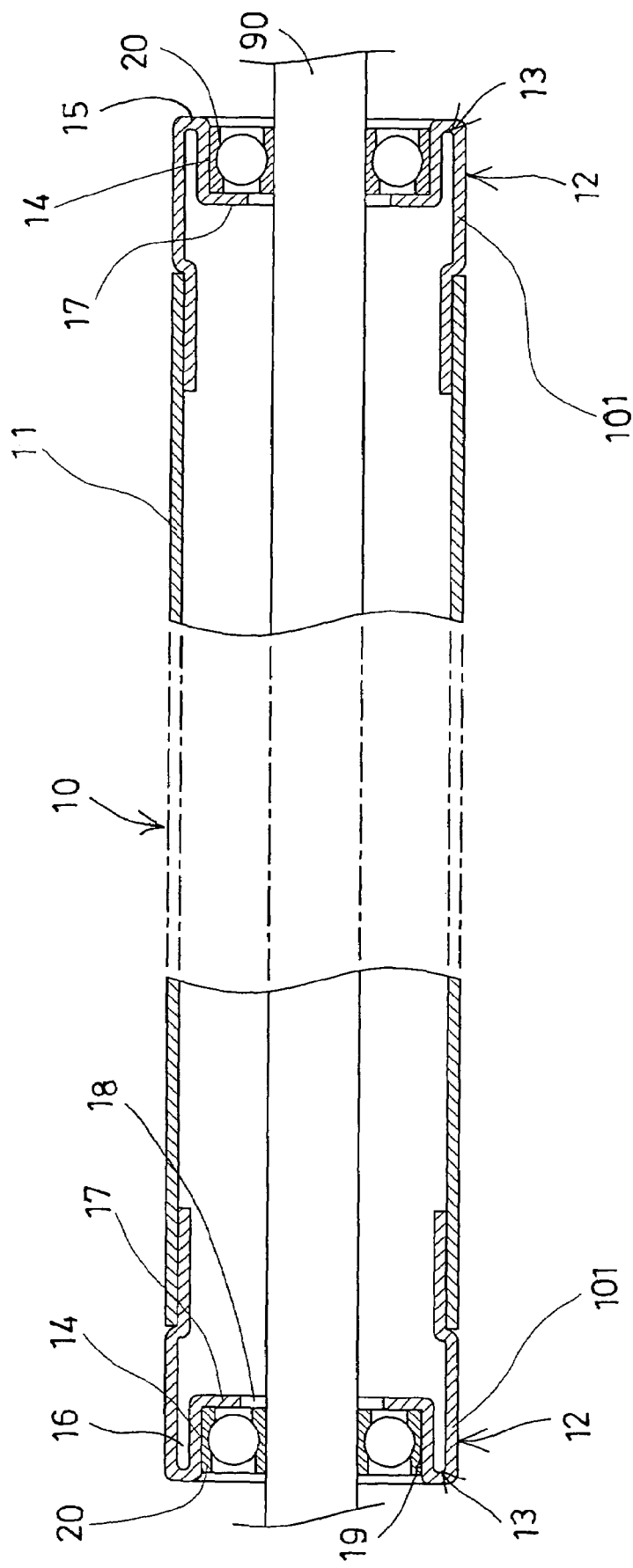
FIG. 3 is a partial cross sectional view similar to FIG. 2, illustrating the other arrangement of the roller device.

The housing 11 may thus be rotatably attached or engaged onto the shaft 90 with the bearings 20, to allow the housing 11 to be smoothly rotated relative to the shaft 90. Alternatively, as shown in FIG. 3, the roller device 10 may include two end segments 101 for securing or attaching to the two end portions 12 of the housing 11 respectively, and each having the cylindrical or peripheral casing 14 and the peripheral flange 17 formed therein, for receiving and supporting the bearing member 20 therein.

Figure 4:
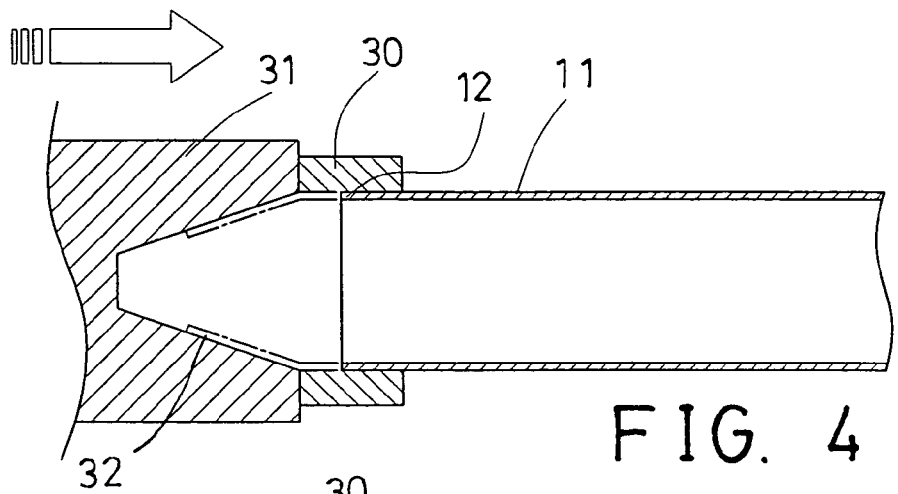
FIGS. 4, 5, 6, 7 are partial cross sectional views illustrating the formation processes for the roller device.
Figure 5:
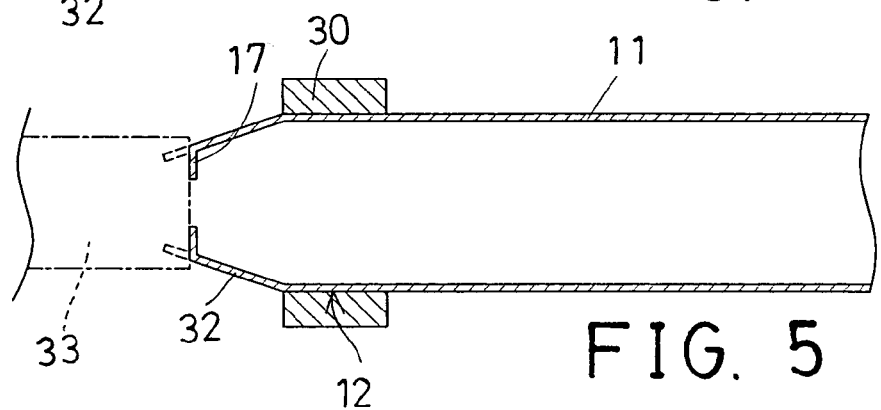

Referring next to FIGS. 4–7, illustrated is one example of the formation processes for forming or manufacturing the roller device. One end or both end portions 12 of the elongated outer cylindrical or tubular housing 11 each may have a positioning ring or mold device 30 engaged thereon, and each is partially extended out of the ring or mold device 30, and then bent or folded by another mold device 31, to form an inclined or cone-shaped peripheral wall 32 (FIG. 4).

Figure 6:
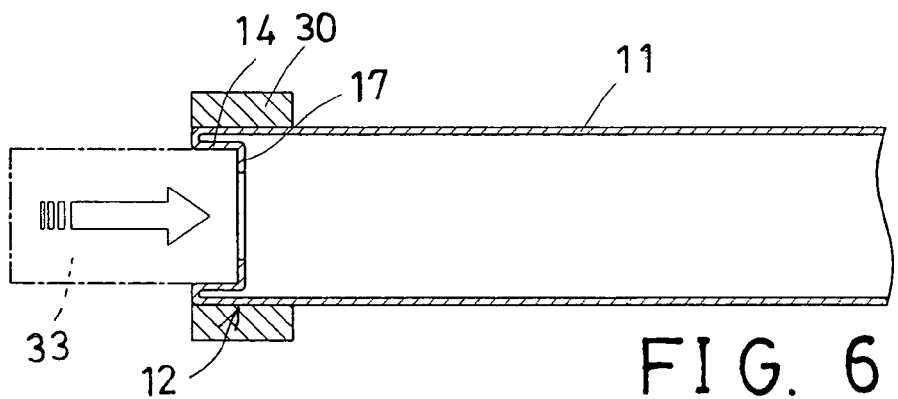
Figure 7:
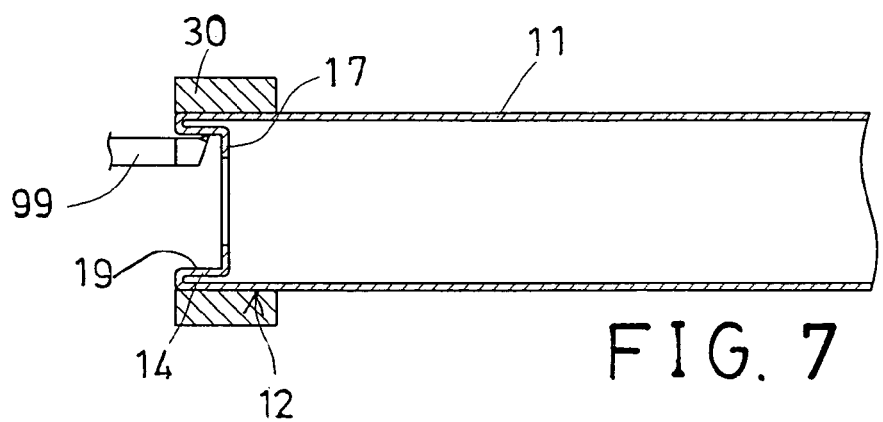
Figure 8:
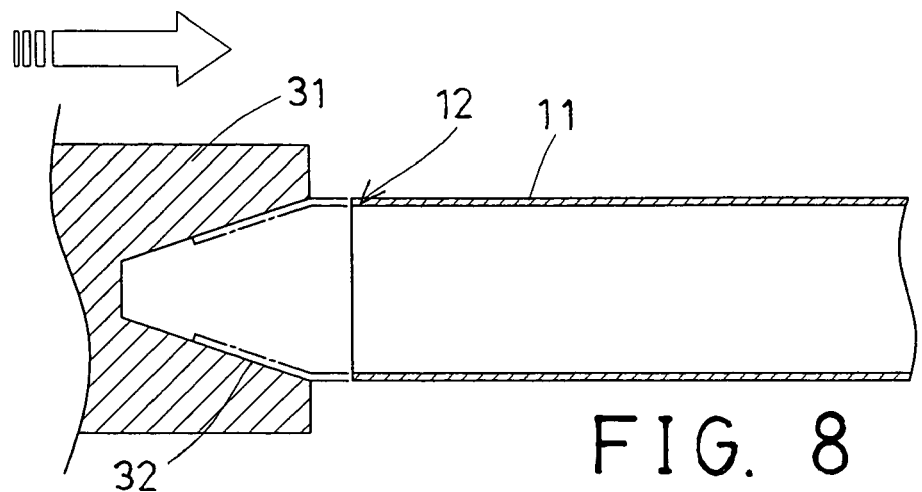
FIGS. 8, 9, 10, 11 are partial cross sectional views similar to FIGS. 4–7 respectively, illustrating the other formation processes for the roller device.
Figure 9:
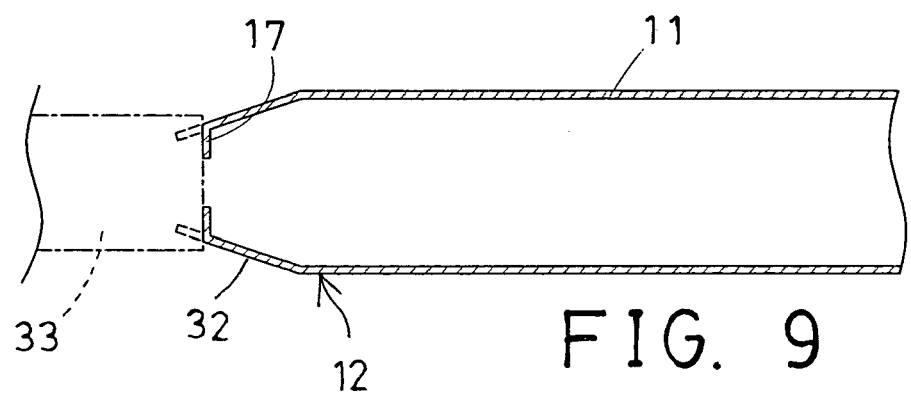
Figure 10:
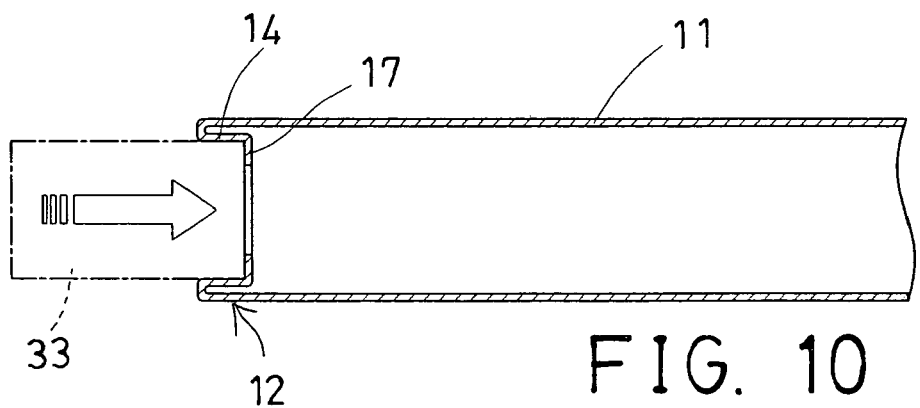
Figure 11:
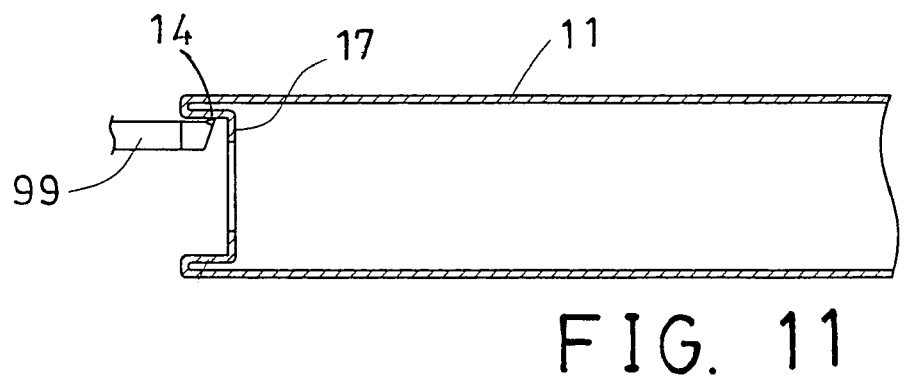

The end portion 12 or the peripheral wall 32 of the housing 11 is then forged or bent or folded by another mold device 33 to form the peripheral flange 17 thereon (FIG. 5), and then forged or bent or folded by another or the same mold device 33 to form the casing 14 therein (FIG. 6). It is preferable that the chamber 19 of the casing 14 is further machined by such as a lathe or machine tool 99 (FIG. 7), in order to form a precise chamber 19 in the casing 14, and to suitably or snugly receive and support the bearing member 20 therein.

Alternatively, as shown in FIGS. 8–11, without the positioning ring or mold device 30, the peripheral wall 32 may also be formed in the end portion 12 of the housing 11 with the mold device 31, and the peripheral flange 17 and the casing 14 may also be formed in the end portion 12 of the housing 11 with the other mold device 33, and the chamber 19 of the casing 14 may also be machined by such as the lathe or machine tool 99 (FIG. 11), to suitably or snugly receive and support the bearing member 20 therein.

Figure 12:
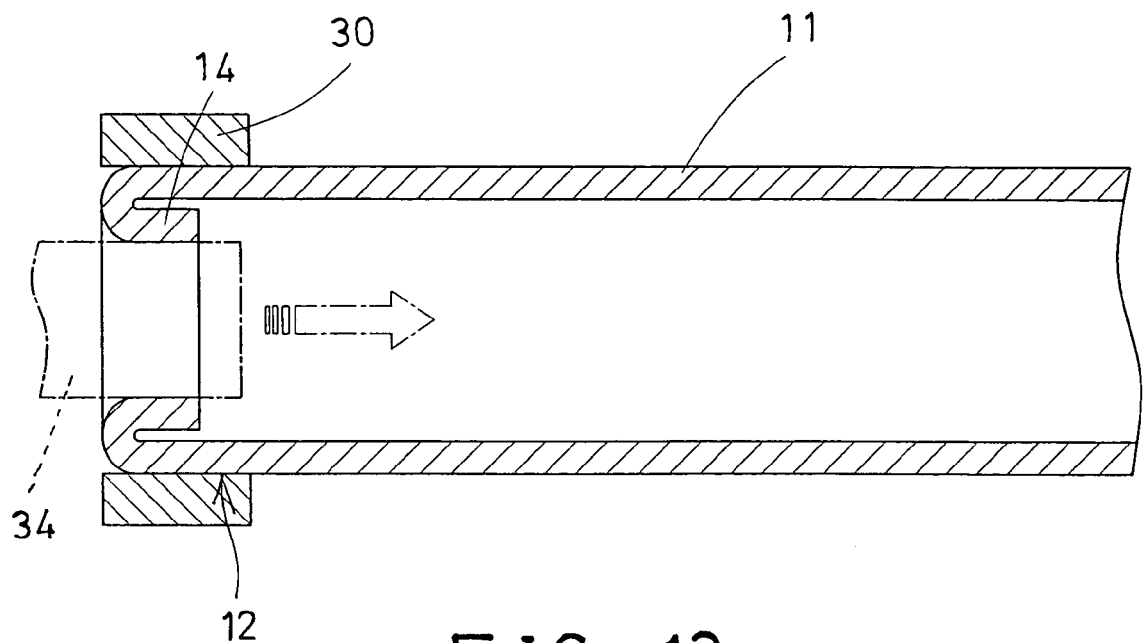
FIGS. 12, 13 are partial cross sectional views similar to FIGS. 4–11, illustrating the further formation processes for the roller device.
Figure 13:
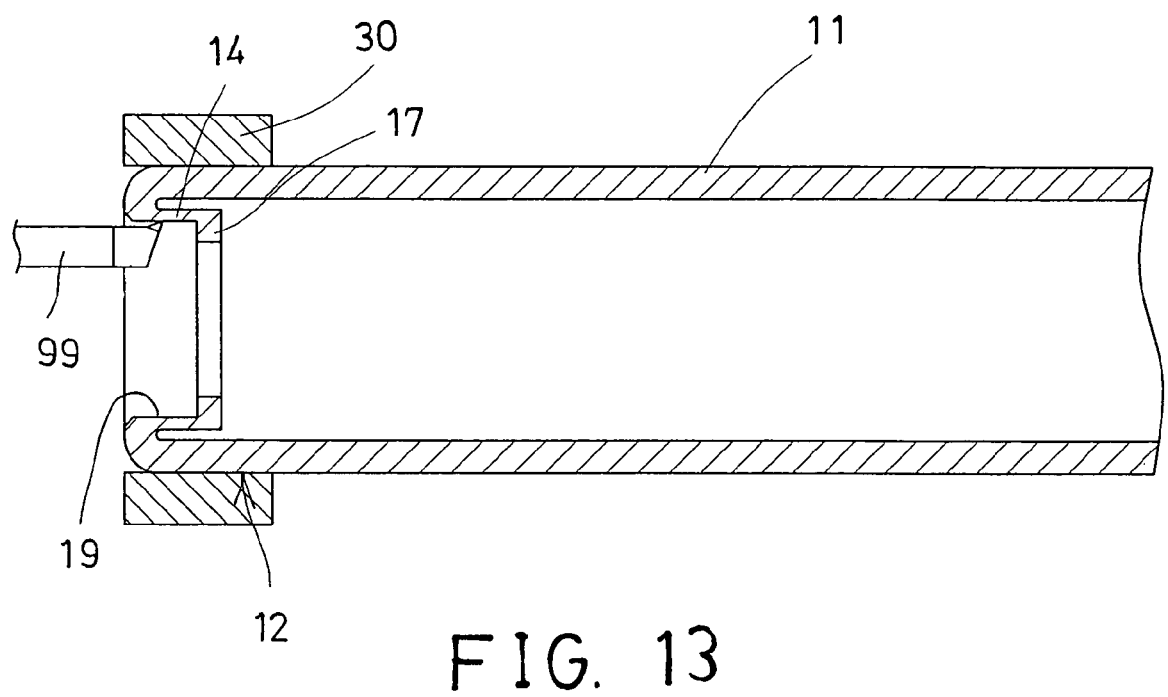

Further alternatively, as shown in FIGS. 12–13, the end portion 12 of the housing 11 may also be directly forged or bent or folded inwardly by a further mold device 34 to directly form the casing 14 therein (FIG. 12), and the casing 14 may then be machined by such as the lathe or machine tool 99 (FIG. 13), to form the partially opened chamber 19 within the casing 14, and to suitably or snugly receive and support the bearing member 20 therein.

It is to be noted that the bearings 20 may be engaged and retained within the casings 14 of the housing 11, for allowing the housing 11 to be easily and readily attached to shafts 90 of the treadmills.

Accordingly, the roller device in accordance with the present invention includes a structure for receiving and retaining one or more bearings therein, and for allowing the roller device to be easily and readily attached to treadmills.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A roller device for attaching to a shaft of a treadmill, said roller device comprising:

a tubular housing including two end portions each having a carrier provided therein, and each of said carriers including a casing folded from said end portion of said housing, and two bearing members engaged in said casings of said carriers respectively, for engaging with a shaft of a treadmill to rotatably attach said housing to the shaft, said casings each including an outer peripheral flap extended radially and outward therefrom and formed integral with said housing, said casings each including an outermost diameter that is smaller than an inner diameter of said housing for forming an annular channel between said casing of said carrier and said housing to resiliently support said casing within said housing, said casings each including an inner peripheral flange extended radially and inwardly therefrom to form an orifice therein for rotatably receiving the shaft therein, and to form a partially opened chamber therein for receiving and anchoring said bearing therein.

* * * * *